(12) United States Patent
Kinzler et al.

(10) Patent No.: US 6,604,886 B2
(45) Date of Patent: Aug. 12, 2003

(54) ADJUSTABLE TELESCOPING SYSTEM FOR A BICYCLE

(75) Inventors: Frederick Warner Kinzler, Trumbull, CT (US); Luigi John Toffolo, Wilton, CT (US); Walker Philip Woodworth, Wilton, CT (US)

(73) Assignee: Frank Roth Co., Inc., Stratford, CT (US)

( * ) Notice: Subject to any disclaimer, the term of this patent is extended or adjusted under 35 U.S.C. 154(b) by 68 days.

(21) Appl. No.: 10/036,294

(22) Filed: Dec. 28, 2001

(65) Prior Publication Data

US 2003/0123925 A1 Jul. 3, 2003

(51) Int. Cl.$^7$ .............. F16B 7/04; F16B 7/10; F16C 19/00
(52) U.S. Cl. ............. 403/370; 403/109.5; 403/365; 403/366; 403/367; 403/368; 384/57
(58) Field of Search ............ 403/109.1–109.8, 403/362, 365–368, 370, 374.1, 377, 374.2, 378, DIG. 8; 384/57; 280/275–277, 279, 280, 283, 284, 287

(56) References Cited

U.S. PATENT DOCUMENTS

| | | | | |
|---|---|---|---|---|
| 4,407,603 A | * | 10/1983 | Lundgren | 403/370 |
| 4,643,591 A | * | 2/1987 | Schwarz | 384/57 X |
| 5,303,944 A | * | 4/1994 | Kalmus | 280/288.4 |
| 5,320,374 A | * | 6/1994 | Farris et al. | 280/276 |
| 5,494,302 A | * | 2/1996 | Farris et al. | 280/276 |
| 5,564,835 A | * | 10/1996 | Hirose et al. | 403/370 X |
| 5,702,092 A | * | 12/1997 | Farris et al. | 267/64.15 |
| 5,924,714 A | * | 7/1999 | Farris et al. | 280/276 |
| 6,007,056 A | * | 12/1999 | Farris et al. | 267/64.15 |
| 6,155,541 A | * | 12/2000 | Farris et al. | 267/64.15 |
| 6,505,696 B1 | * | 1/2003 | Senger | 384/56 |
| 6,533,459 B2 | * | 3/2003 | Podhajecki et al. | 384/57 |

* cited by examiner

*Primary Examiner*—James R. Brittain
*Assistant Examiner*—Ruth C. Rodriguez (57) ABSTRACT

In a preferred embodiment, a light weight telescope assembly for bicycles that is readily adjustable by riders in the field and that provides smooth action of the suspension system. This telescope assembly contains roller bearings to reduce stiction and prevent torsional losses. The adjustment mechanism includes an adjustable outer race shim composed of two oppositely tapered races moving longitudinally in relation to each other, thereby causing their combined thickness to expand or contract thus allowing the bearing pre-load to be adjustable. Integral with this adjustable pre-load mechanism is a bayonet-style collar whose design enables bearing pre-load adjustment from a position that is readily accessible by consumers. In addition, this collar enables greater geometric latitude on the shape of the inner tube, thereby enabling significant strengthening of the telescoping assembly using light weight materials and lower cost manufacturing processes that hitherto have been unachievable.

11 Claims, 7 Drawing Sheets

SECTION A-A

ADJUSTABLE TELESCOPING SYSTEM FOR A BICYCLE

RELATED APPLICATIONS

Related Applications:

| | | |
|---|---|---|
| 5,320,374 | 6/1994 | Farris et al. |
| 5,494,302 | 2/1996 | Farris et al. |
| 5,702,092 | 12/1997 | Farris et al. |
| 5,924,714 | 7/1999 | Farris et al. |
| 6,007,056 | 12/1999 | Farris et al. |
| 6,155,541 | 12/2000 | Farris et al. |
| 5,509,675 | 4/1996 | Barnett |
| 5,195,766 | 3/1993 | Dohrmann et al. |
| 4,971,344 | 11/1990 | Turner |
| 4,609,202 | 9/1986 | Miyakushi et al. |

BACKGROUND OF THE INVENTION

1. Field of the Invention

The present invention relates to bicycle suspension systems and more particularly to a suspension fork assembly. This invention is an improvement on the system first described by Farris et al. U.S. Pat. No. 5,320,374 and subsequent patents (U.S. Pat. Nos. 5,494,302, 5,702,092, 5,924,714, 6,007,056, and 6,155,541). The related patents address the geometric configuration of two tubes, one inside the other, both containing several flats permitting the insertion of hardened races and roller needle bearings between the two tubes. The resulting telescoping action provides longitudinal motion, but prohibits torsional movement. A key objective is to achieve a smooth, plush feel of the telescoping action.

2. Description of the Prior Art

Various suspension systems have been proposed and developed for bicycles. Many of these systems utilize a pair of telescoping assemblies between which the front wheel is mounted. Each assembly comprises an outer tube and an inner tube which is free to move in and out of the outer tube and is cushioned by a damper of one sort or another. The outer tubes are connected at the lower ends to the bicycle axle of the front wheel and the upper ends of the inner tube are connected together in a fashion similar to the usual upper end of a bicycle fork.

As is known to those skilled in the art, these types of suspension systems use anti-friction bushings to allow free movement of the inner tube within the outer tube. These bushings have undesirable static friction called "stiction." Because of this, the suspension systems using such bushings tend to stick and release. In addition, the two telescoping assemblies also have to be fixed together in some manner as through a "U" shaped yoke at the upper ends of the tubes to eliminate twisting. Even with this "U" shaped yoke the torsional stiffness of these types of assemblies is still limited.

A prior art example of a system which overcomes this issue is shown in Farris et al. U.S. Pat No. 5,320,374 and subsequent applications. In this example an improved form of suspension system is described using an outer tube which is adapted to be mounted in and extend through the head tube of the bicycle frame and an inner tube connected to the fork of the bicycle which telescopes within the outer tube. The inner surface of the outer tube and the outer surface of the inner tube each have a plurality of axially arranged opposing longitudinal flat sections such as four on each tube. A plurality of hardened steel inner race shims are positioned longitudinally on the flats of the inner tube. A plurality of hardened steel outer race shims are positioned longitudinally on the flats of the outer tube. A plurality of needle bearings are disposed between the tubes in between the respective inner and outer race shims. This arrangement allows the two tubes to freely telescope in and out with respect to one another without any significant static friction and also serves to transmit the torsional steering force from the outer tube to the inner tube. This particular system is used extensively today because it can bear a combination of loads comprising very high radial loads and at the same time provide stable and tight rotational motion in steering of the front wheel through the suspension system from the handlebars.

Several problems exist, however, with the practicality of the needle bearing system. First, the preferred embodiment and alternate embodiment described in the prior art for the purpose of adjusting bearing pre-load are impractical, difficult to adjust and expensive. Tolerance stack-up during the manufacturing process makes it difficult and costly to attain the desired bearing pre-load. Assembly time renders the adjustment of multiple shims in the described embodiments impractical and expensive. Excessive bearing pre-load develops objectionable noise, excessive heat and wear, and a non-smooth feeling ride. Insufficient bearing pre-load encourages migration of the bearings and races, resulting in a poorly or non-functioning unit. Consumer preference would be to have the ability to adjust the bearing pre-load depending on the ride and to be able to do it quickly and simply. The prior art designs are impractical as the adjustment mechanisms are located on the outer tube which is fixed inside the head tube of the bicycle and inaccessible without disassembly of the front fork.

Secondly, the highly stressed inner tube must be formed of a material and in a manner such that it bends rather than breaks. High strength steel is commonly used for the inner tube for this purpose, but it is heavy and counter to the consumer's preference. Lighter materials such as Aluminum in combination with strengthening processes such as shot-peening to strengthen the outer skin have been used as a material for the inner tube. Here-to-for, unfortunately, telescope assemblies whose inner tube connects to the fork crown with greater than 70 mm length of travel have been unable to pass stress testing using the present art as described in the aforementioned patents despite the additional costly process of shot-peening and use of expensive high-strength aluminum alloys. Attempting to increase the diameter of the tubes to add strength is also impractical as larger tube diameters increase cost, obsolete existing factory tooling and is generally counter to the consumer's aesthetic preference.

A collar on the telescope assembly plays a vital role in the functioning of the telescoping system. The collar has a very fine thread that grips the outer tube. This fine thread makes the mating parts expensive to make, and prone to scrap because of the propensity to cross thread during assembly. Another key function of the lower collar is to prevent the bearing needles from exiting the telescope at the bottom of its excursion. If the bearing needles escape, the entire front fork will come apart. This is prevented by closing down the internal diameter of the collar. However, it cannot be closed down enough to encounter the full length of the bearing cage because the bending of the inner tube when under load may cause it to rub against the collar. A compromise must be made that places severe restrictions on the design, including the outside diameter of the inner tube.

SUMMARY OF THE INVENTION

This present invention is an improvement on the telescoping system described in U.S. Pat. No. 5,320,374 and subsequent related patents (U.S. Pat. No. 5,494,302, 5,702,092, 5,924,714, 6,007,056, and 6,155,541). It is a principal object of the present invention to provide an improved mechanism that allows for adjustment of the pre-load applied to the bearing train. In particular, this invention uses a unique method for achieving adjustable race thickness within an extremely tight space without negatively impacting either the outer or inner tube's strength and with convenient user access for adjustment in the field.

It is yet another object of the invention to provide a low cost collar design which enables consistent and accurate orientation of the collar in relation to the needle bearings preventing the needle bearings from exiting the space in between the inner tube and outer tube. It is yet another object of the invention to provide a collar with access to one of the outer races to allow user adjustment of the compressive load in the field.

It is yet another object of the invention to provide a telescoping assembly with at least 80 mm of travel made of light weight aluminum to qualify or pass life testing while maintaining the present outside geometric configuration of the telescoping system and the connection of the inner tube to the fork crown. This is accomplished through the use of a shaped inner tube and conical relief of the outer tube. The shaped inner tube has additional strength characteristics at critical locations to help reduce breaking under stress. In addition, the shaped inner tube eliminates the need for shot-peening or expensive light weight alloys to increase strength, yet does not increase the size of the entire telescoping assembly. The inner tube remains small in less critical areas so as to minimize weight, and allows sufficient clearance with the collar so as to eliminate interfering with the collar during stress loading. The conical relief allows the flexing of the shaped inner tube under load so as not to interfere or scrape the outer tube.

DETAILED DESCRIPTION OF THE INVENTION

Figure 1:
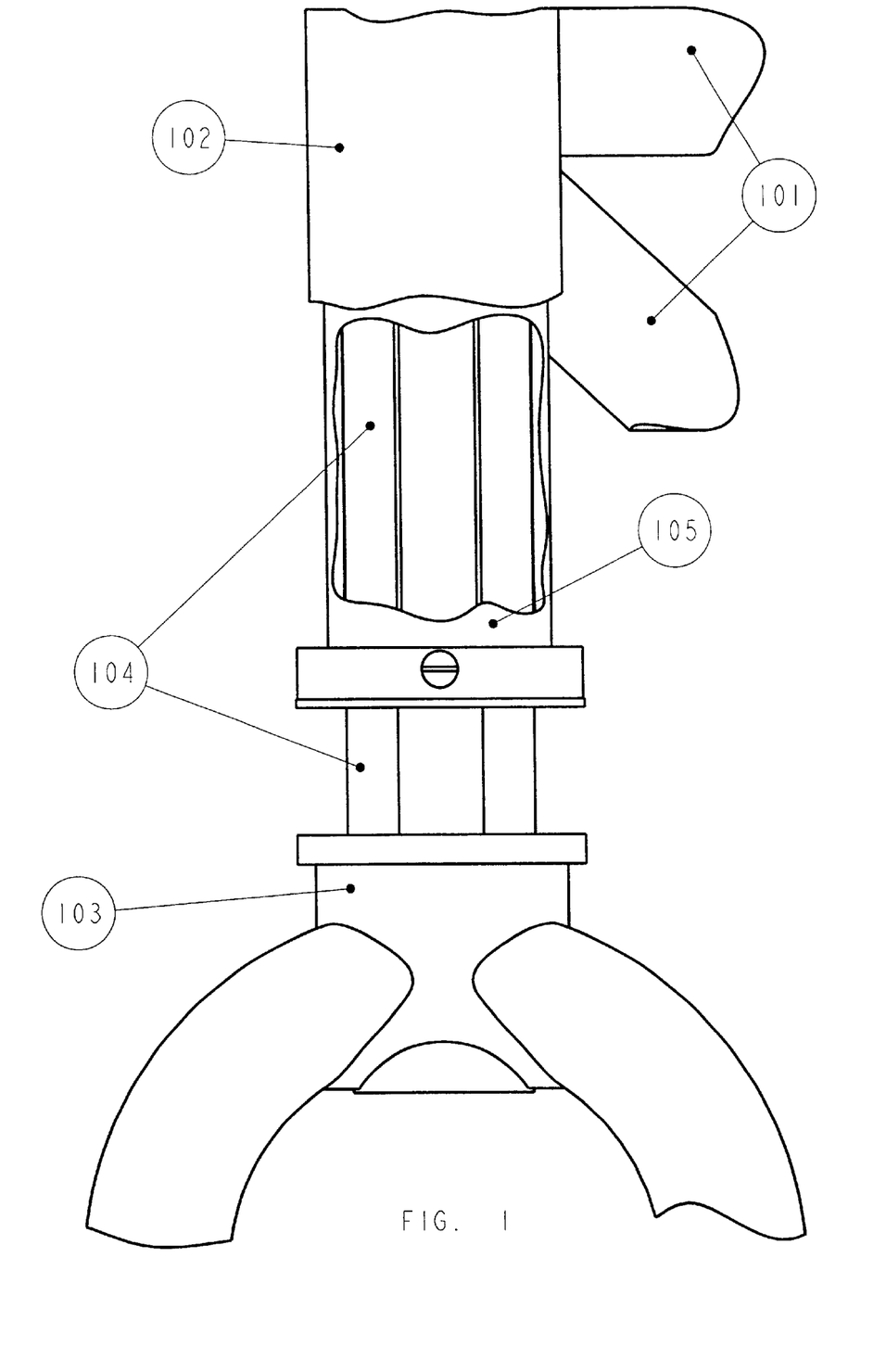
FIG. 1 shows a simplified view illustrating the preferred form of suspension fork according to the present invention.

FIG. 1 shows a bicycle frame (partial) 101 along with a head tube 102. A fork crown (partial) 103 has an inner tube 104 of a telescoping assembly affixed into it. The outer tube 105 of the telescoping assembly is pressed into the head tube 102 using upper and lower journal bearings (not shown) to allow for steering rotation. The upper end of the outer steer tube 102 is connected to the handlebar stem (not shown).

Figures 2A, 2B, 2C:
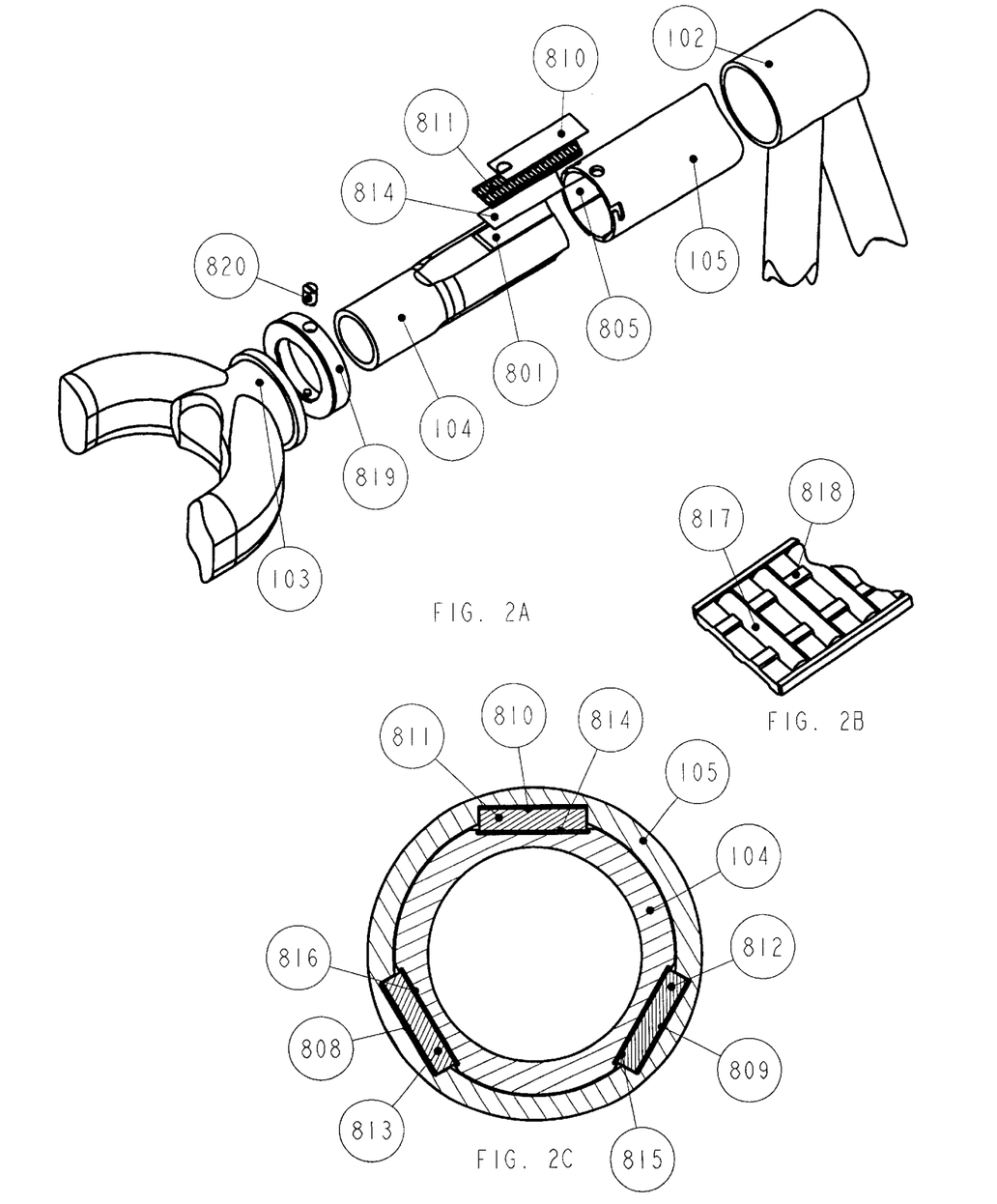
FIG. 2A is an exploded view of the telescoping assembly in its preferred embodiment illustrating inner and outer tubes, a needle bearing assembly, an inner race, outer adjustable race, collar and cam.
FIG. 2B is a partial view of a needle bearing assembly showing the relationship of the cage and needle.
FIG. 2C is a cross-sectional view illustrating the relationship of outer races, bearing assemblies, inner races, inner tube and outer tube in assembly form.

FIG. 2A is an exploded view of the telescoping assembly showing parts germane to this invention. The outer wall of the inner tube 104 depicts a plurality of axially extending longitudinal flat surfaces or flats of which one is shown 801. In the preferred embodiment there are three such flats, however there can be more or less flats used. In the inner wall of the outer tube 105, there are axially extending flats of which one is shown 805 that are opposing the corresponding flats on the inner tube. Contained between the inner and outer tube sets of flats are sets of outer races of which one is adjustable and shown 810, bearing needle assemblies of which one is shown 811 and inner races of which one is shown 814. The inner and outer races are commonly made of hardened carbon steel or stainless steel. There are a corresponding number of sets of bearing needle assemblies with the number of flats on the outer tube and inner tube. In the preferred embodiment there are 3 sets of bearing assemblies, however, there could be more or less.

FIG. 2B shows a detailed view of the bearing needle assemblies. These assemblies are a plurality of hardened chrome steel needle bearings 817 typically 22 needle bearings housed in a plastic cage 818 and ride in between corresponding inner and outer races.

FIG. 2C shows a cross-sectional view of the preferred.embodiment of the telescope highlighting the relationship of the inner tube 104, the outer tube 105, the inner races 814–816, the outer races 808–810 and the needle bearing assemblies 811–813. The needle bearing assemblies 811–813 allow the inner tube 104 to travel freely in an axial direction with respect to the outer tube 105. Additionally, the needle bearing assemblies in conjunction with the associated flats on the inner tube, inner races 814–816, outer races 808–810 and outer tube 105 enable the steering torsional or rotary action to be imparted from handlebars connected to the handlebar stem via the telescoping tubes to the fork and to the front wheel (not shown). The needle bearings bear high radial loads from the fork during movement over rough terrain. The length of the flats on the inner tube determine the amount of telescoping action. Typically the amount of telescoping action is desired to be 70 mm to 130 mm. It is important to note that the maximum diameter desired of the inner tube 104 at the connection with the fork is 1.250". This provides sufficient strength while minimizing weight. Increasing the diameter at this connection would strengthen the assembly, but also increase the dimensions of the fork crown 103, head tube 102 and outer tube 105 as well as the upper and lower journal bearings (not shown). These components are already considered aesthetically oversized and therefore enlarging the outside dimensions of these components is undesirable.

In FIG. 2A, lower collar 819 houses an adjustable cam 820 for adjusting the thickness of outer race 810 as well as serve to contain the needle bearing assemblies from exiting the telescoping assembly when the inner tube 104 is fully extended relative to the outer tube 105.

Figure 3A:
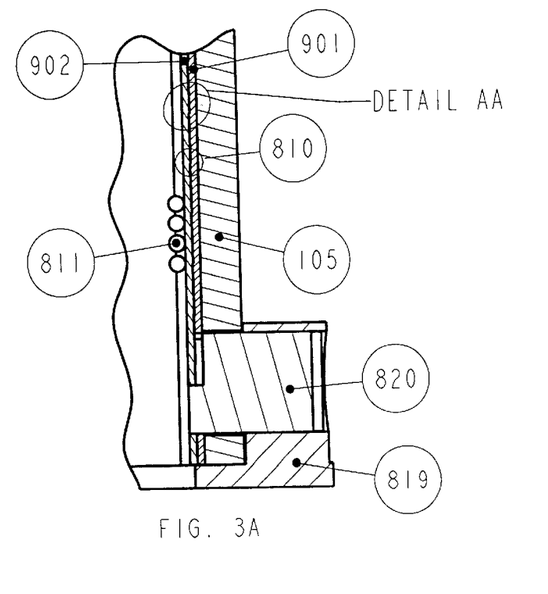
FIG. 3A shows the cross-sectional view of the relationship of the collar, cam, outer tube and the adjustable race.

FIG. 3A shows a cross-sectional view of the telescoping assembly illustrating how the adjustable race components are configured. Adjustable outer race shim-set 810 is comprised of two races 901 and 902 that are sandwiched together. Cam 820 fits through a hole in the collar 819, outer tube 105, and race 901 to enable longitudinal adjustment of race 902, thereby increasing the thickness of the adjustable race shim-set 810 and adjustment of the pre-load on the needle bearing assembly 811.

Figures 3B, 3D:
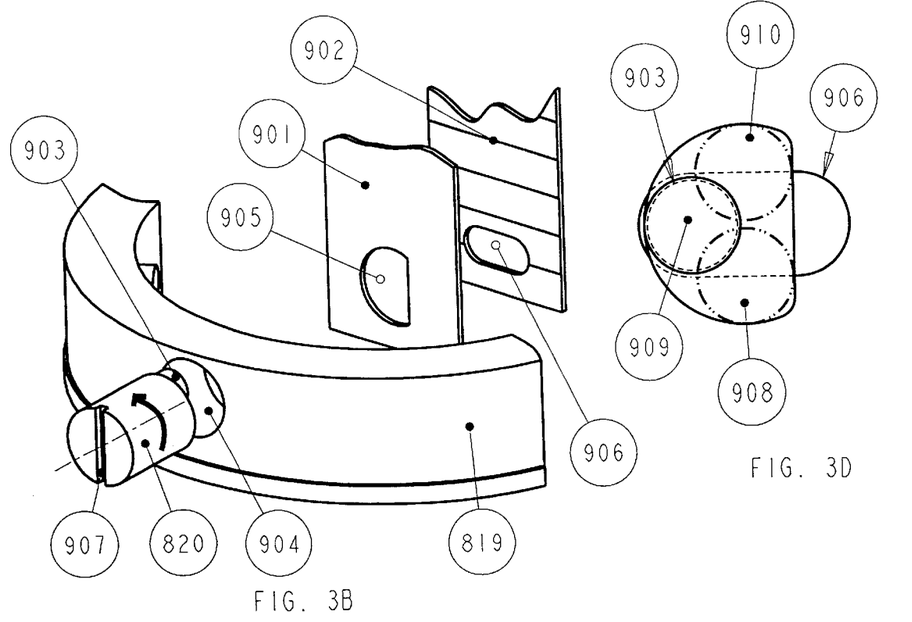
FIG. 3B shows the exploded view of the adjustable race and cam operation.
FIG. 3D shows the cam positions.

FIG. 3B illustrates the ability to adjust the outer race thickness through the use of cam element 820. The cam element 820 resides in a hole 904 located in the collar 819. The hole in the collar is aligned with a corresponding hole through the wall of the outer tube (not shown) so that the cam element can mate with the two saw tooth races 901 and 902. The cam element has an eccentric anvil 903 which passes through the semi-circular cutout 905 in the saw tooth race 901 and mates with the oval cutout 906 in the saw-tooth race 902. The cam element 820 can be turned using a standard screwdriver (not shown) by means of a slot 907. As the cam element is turned, the saw-tooth race 902 is moved up or down relative to race 901 causing thickness expansion or contraction. The saw-tooth race 901 is stationary. The saw-tooth race 902 moves up or down with the cam eccentric anvil position.

Figure 3C:
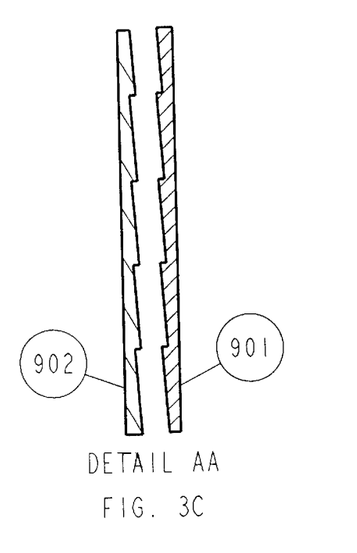
FIG. 3C shows a detailed view of the adjustable race profile.

FIG. 3C illustrates a detailed cross-sectional view of,the saw-tooth pattern on each side of races 901 and 902. Linear movement of race 902 relative to 901 causes the saw-tooth profiles on each race to ride up or down on each other causing thickness expansion or contraction. In the preferred embodiment, the saw tooth angle would be such that a race linear motion of 0.125" would generate a thickness expansion of 0.0014." It should be noted that the angle can vary depending on the degree of adjustable and that the linear motion relative to the thickness expansion can be more or less than the preferred embodiment. The number of saw teeth on each shim will be dependent on the angle and the length of travel desired.

FIG. 3D shows a detailed view of the anvil position in the fully compressed position 908, the half expanded position 909 and the fully expanded 910. The oval 906 moves up or down with the anvil 903, shown in FIG. 3D in the half expanded position.

Figure 4A:
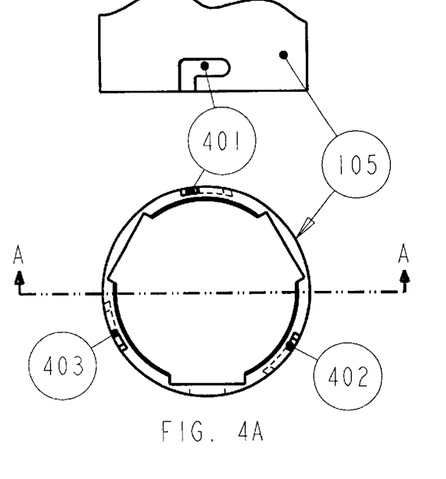
FIG. 4A shows the detailed configuration of the preferred embodiment of the outer tube.

FIG. 4A shows the outer tube 105 that contains three bayonet type grooves 401–403 on its outer periphery in relationship to the internal flats.

Figure 4B:
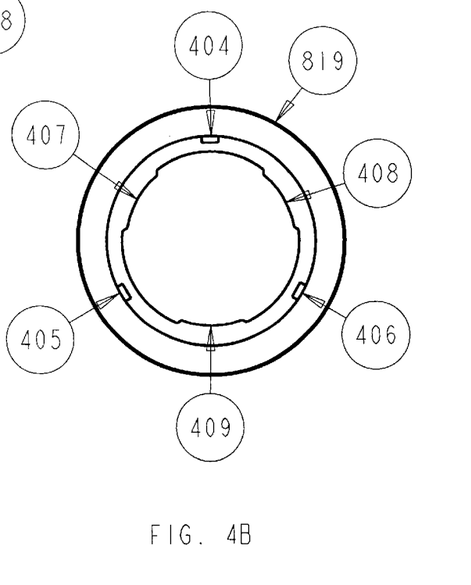
FIG. 4B shows the detailed configuration of the preferred embodiment of the collar.

FIG. 4B shows the collar 819 that contains three pins 404–406 that line up with the vertical portion of the bayonet grooves on the outer tube. The collar is pushed on and twisted allowing the pins 404–406 to slide into the horizontal portion of the groove on the outer tube, locking the collar in place. Collar chords 407–409 are designed to move into position across the corresponding flats on the inner tube to prevent bearing assemblies from exiting outside the outer tube in the space created between the inner tube and outer tube.

Figure 4C:
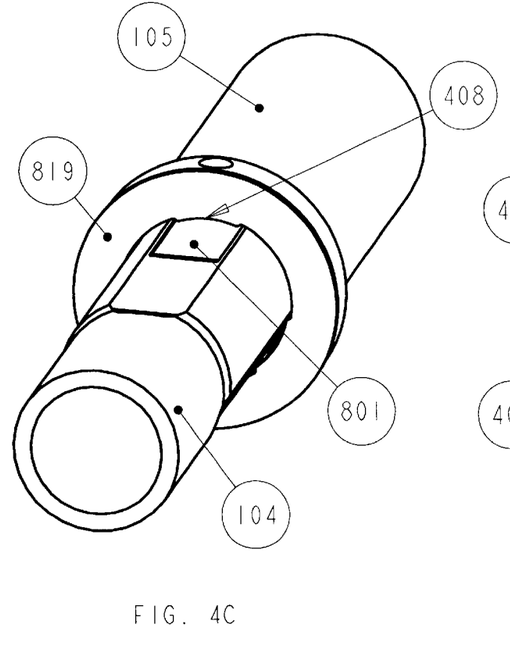
FIG. 4C shows the relationship of the collar chords and inner tube.
Figure 4D:
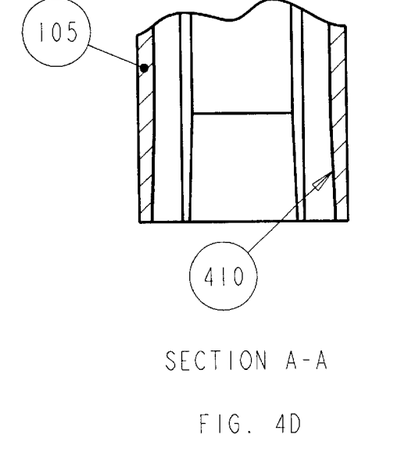
FIG. 4D shows a cross-sectional of the outer tube at the mating end with the collar.

FIG. 4C shows the relationship of the inner tube 104, outer tube 105 and bayonet collar 819. The bayonet style collar 819 allows for a shaped inner tube which has a diameter greater than the chord diameter of the collar 819. The inner tube 104 can be pushed fully into the outer tube 105 allowing the collar to be put in place. Only then can the inner tube 104 be extended to its normal position allowing the larger diameter inner tube to pass through the collar in the space between the chords. Collar chords of which one is shown 408 are aligned with the corresponding flats on the inner tube of which one is shown 801 allowing these smaller chords to contain the needle bearings from exiting the telescoping assembly FIG. 4D shows a cross-section view of the outer tube 105 at the collar end showing a conical internal shape 410. This conical shape permits the larger diameter inner tube to flex during fork loading so as not to contact the inner diameter of the outer tube 105.

Figures 5A, 5B:
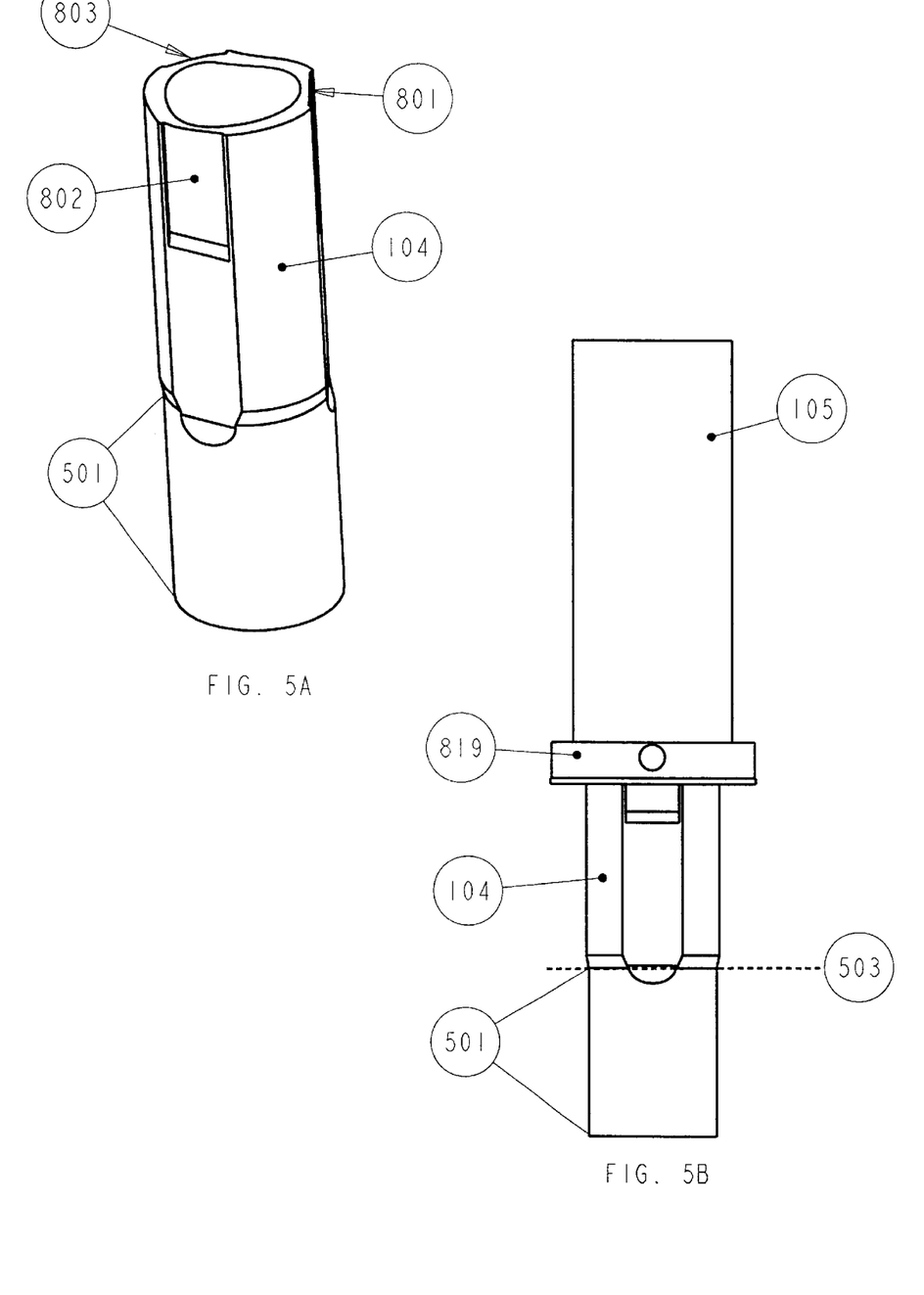
FIG. 5A shows a detailed view of the inner tube designed for minimum weight and high strength.
FIG. 5B shows the relationship of the flats on the inner tube and their relationship to the outer tube.

FIG. 5A illustrates the inner tube 104. The inner tube has a plurality of axially extending longitudinal flat surfaces or flats 801–803. Either three or four flats are commonly used, more or less could be used as well. In the preferred embodiment three flats are used. In this embodiment, it is desired to have the inner tube be of light weight material such as aluminum. It is also desired to eliminate costly strengthening processes such as shot peening of the inner tube. The inner tube therefore has been strengthened by enlarging the inner tube diameter except in area 501, which is buried in the fork crown and not subject to lateral forces. At area 501 the diameter is typically 1.250" extending upwards in this embodiment to 1.300" for the rest of the tube.

FIG. 5B shows the relationship of the inner tube and the outer tube when assembled. It is important for the proper function of the lightweight telescope to have the race flats continue to the transition point where the inner tube diameter decreases back to 1.250" indicated by line 503. The extension of these flats allows for assembly of the collar 819 to the outer tube 105 without interference from the larger diameter of the inner tube 104. The collar 819 is twisted and locked into place allowing the collar chords on the collar to be positioned over the flats to prevent needle bearings from exiting the telescope assembly.

Figures 6A, 6B:
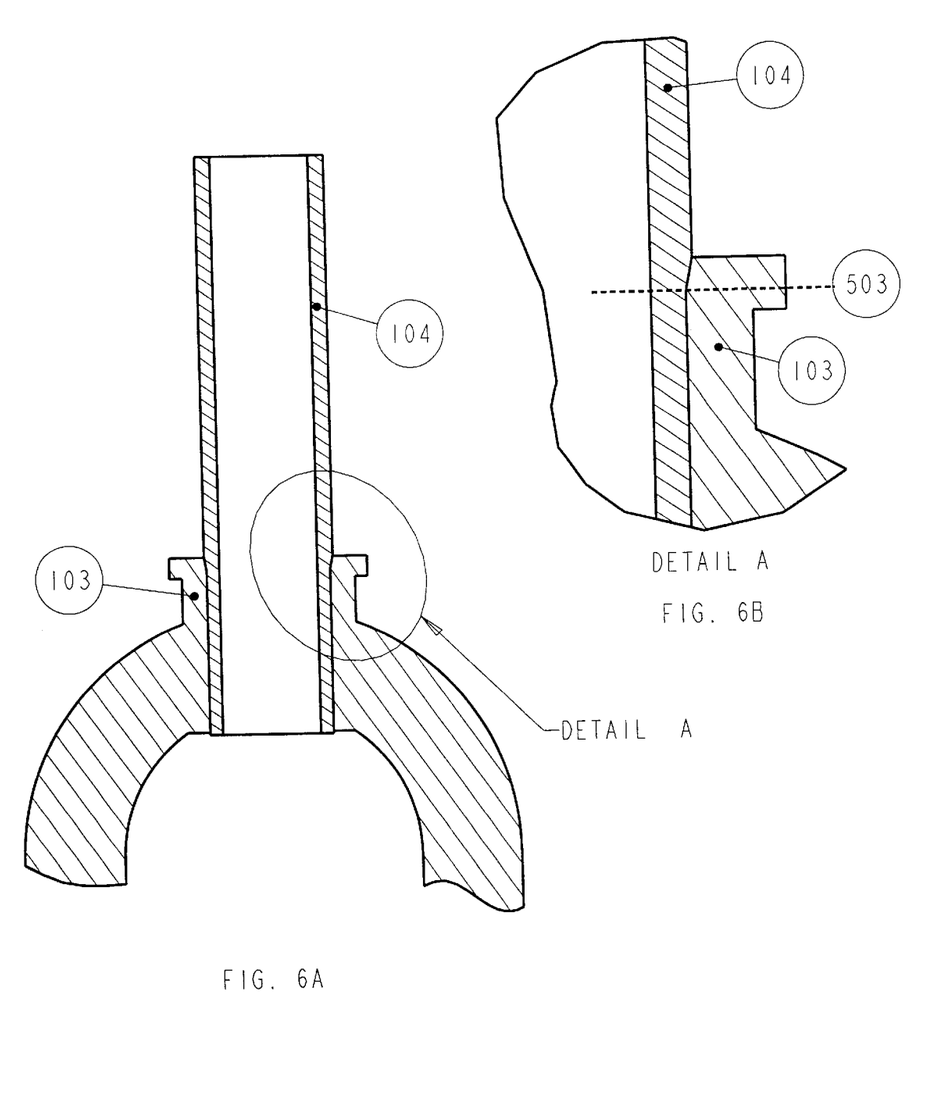
FIG. 6A illustrates a cross-sectional view of the inner tube in relationship to the fork crown.
FIG. 6B shows a detailed cross-sectional view of the inner tube shape in relationship to the fork crown.

FIG. 6A illustrates a cross-sectional view of the inner tube configuration and its relationship to the fork crown. The inner tube 104 is normally pressed into the fork crown 103. FIG. 6B shows a detailed cross-sectional view of the fork crown 103 and the inner tube 104, whereby the diameter of the inner tube 104 remains enlarged into the press area of the fork crown 103. The line 503 indicates the point where the inner tube diameter decreases back to 1.250". By pressing the inner tube into the fork crown 103 past the point where the diameter is smallest, allows for increased strength at the position on the inner tube where the maximum lateral forces are concentrated.

Figure 7:
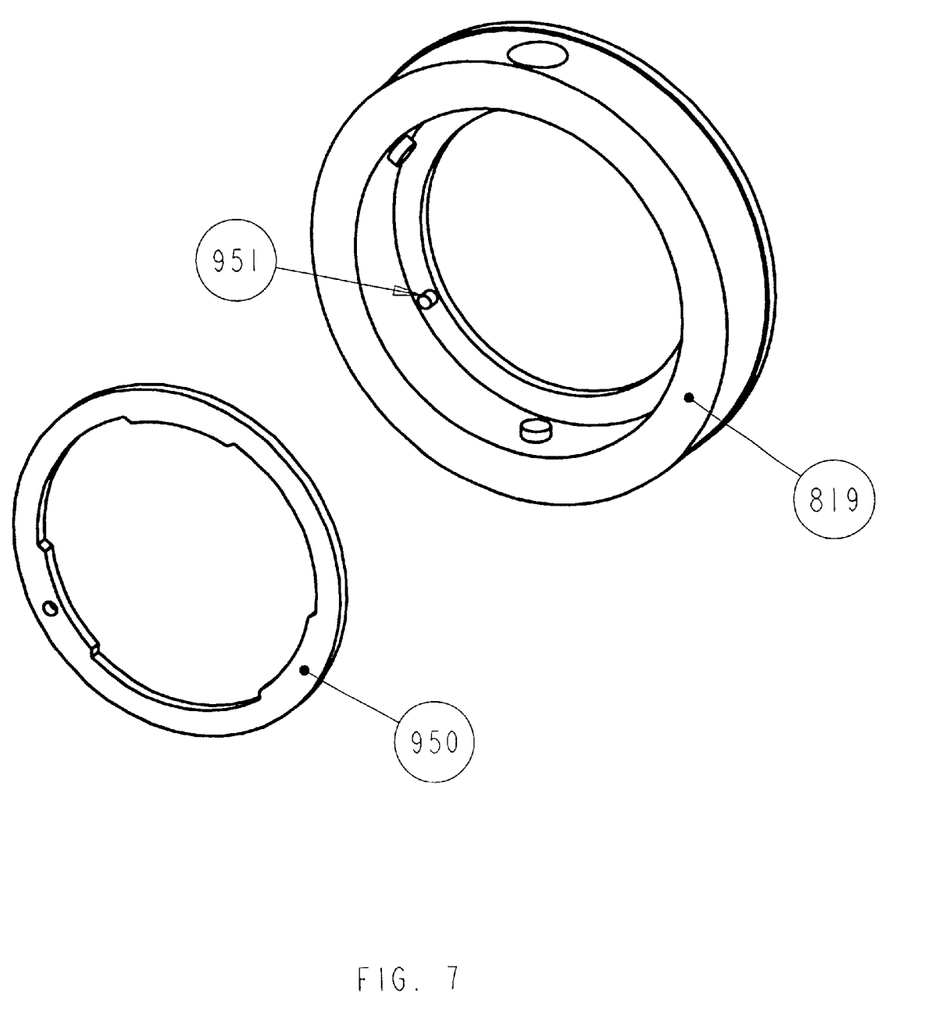
FIG. 7 shows an alternate embodiment for a collar configuration with a collar shim.

FIG. 7 illustrates an alternate embodiment of the collar configuration. The collar 819 has no chords of smaller diameter, but relies on a steel shim 950 and orientation pin 951 as a means of preventing bearing needle assemblies of travelling past the end of the outer tube (not shown). Steel shim 950 has the chords built in and relies on orientation pin 951 to align the chords with the flats on the inner tube so that the collar/shim combination can be assembled over the inner tube and onto the outer tube in the same manner as described previously.

What is claimed is:

1. An adjustable telescoping assembly used for bicycle suspension fork systems comprising:

an elongated inner tube and outer tube co-axially mounted together to telescope with respect to each other, the inner tube having an outer wall with at least three or more axially extending longitudinal flat surfaces, the outer tube having an inner wall with a like number of corresponding flat surfaces as the inner tube, a like number of inner race shims located longitudinally along the flat surfaces of the inner tube, a like number of outer race shims located longitudinally along the flat surface of of the outer tube, one or more of which is adjustable, a like number of needle bearings located longitudinally between inner and outer race shims whereby the flat surfaces of the inner and outer tubes in combination with the needle bearings allow the inner and outer tubes to telescope smoothly with respect to each other, an adjustable outer race shim-set comprised of two saw-tooth races that are adjusted longitudinally relative to each other to expand or contract a combined thickness of the outer race shim-set which, in combination with the inner race and the needle bearings, provides a mechanism of varying a desired pre-load of the needle bearings, a collar with smaller chords assembled onto the outer tube in a bayonet-style fashion which when twisted onto the outer tube prevent the needle bearings from exiting the telescoping assembly, a cam or plurality of cams which mate with the adjustable outer race shim sets allowing expansion or contraction of adjustable outer race shim sets providing a means of adjusting bearing pre-load in the field.

2. An adjustable telescoping assembly as in claim 1 wherein an adjustable outer race is comprised of two hardened steel shims mated together, whereby mating surfaces of each race is a saw tooth pattern comprised of one or more saw teeth, whereby the race shims are adjusted longitudinally with respect to each other to expand or contract the combined thickness of the adjustable outer race shim-set.

3. An adjustable telescoping assembly as in claim 1 wherein an adjustable outer race shim-set is comprised of two hardened steel shims mated together whereby one race of the shim-set contains an oval cutout on one end and the other race shim of the shim-set contains a semicircular cutout, whereby the two cutouts mate to provide a means of moving one saw-tooth race longitudinally with respect to each other.

4. An adjustable telescoping assembly as in claim 1, whereby the rotation of an eccentric cam mates with an adjustable outer race shim-set and is used as the means of moving one race shim of the adjustable outer race shim-set longitudinally with respect to the other race shim in order to adjust the thickness of the adjustable outer race shim-set.

5. An adjustable telescoping assembly as in claim 1, wherein such cam mechanism fits through the semi-circular cutout on one race shim and mates, in the oval cutout of the mating race shim which together form the adjustable outer race shim-set.

6. An adjustable telescoping assembly as in claim 1, wherein a collar containing one or more holes and an outer tube containing one or more holes perpendicular to one or more of the flats on the inner wall of the outer tube are aligned to provide one or more access holes as a means of allowing one or more eccentric cams to fit through such access holes and mates with a plurality of adjustable outer race shim sets, such cam providing the means of bearing pre-load adjustment.

7. An adjustable telescoping assembly as in claim 1, wherein the collar contains pins that mate with grooves on the outside of the outer tube for the purposes locking in a bayonet style fashion.

8. An adjustable telescoping assembly as in claim 1, wherein the collar contains smaller chords that align with the inner race flats on the inner tube so as to contain the needle bearings with the telescoping assembly and prevent them from exiting the telescoping assembly.

9. An adjustable telescoping assembly as in claim 1, whereby travel of the telescope assembly is 80 mm or more and wherein the inner tube is made from lightweight materials such as aluminum, whereby the strength of the inner tube is enhanced by enlarging an inner tube diameter, but reducing said diameter to 1.250" inside a fork crown, and whereby the inner tube has flats that extend up to the point of diameter reduction on the inner tube to allow assembly of the collar.

10. A telescoping assembly as in claim 1 wherein an outer tube inside diameter is conically tapered to provide additional clearance for the inner tube so as to avoid contact with the outer tube as the inner tube flexes.

11. An adjustable telescoping assembly used for bicycle suspension fork systems comprising an elongated inner tube and outer tube co-axially mounted together to telescope with respect to each other, the inner tube having an outer wall with at least three or more axially extending longitudinal flat surfaces, the outer tube having an inner wall with a like number of corresponding flat surfaces as the inner, a like number of inner race shims located longitudinally along the flat surfaces of the inner tube, a like number of outer race shims located longitudinally along the flat surface of of the outer tube, one or more of which is adjustable, a like number of needle bearings located longitudinally between inner and outer race shims whereby the flat surfaces of the inner and outer tubes in combination with needle bearing sets allow the inner and outer tubes to telescope smoothly with respect to each other, an adjustable outer race shim-set comprised of two saw-tooth races that are adjusted longitudinally relative to each other to expand or contract a combined thickness of the outer race shim-set which in combination with the inner race and the needle bearings providing a mechanism of varying a desired pre-load of the needle bearings, a cam or plurality of cams which mate with the adjustable outer race shim-sets allowing expansion or contraction of adjustable outer race shim-sets providing a means of adjusting bearing pre-load in the field a collar assembled onto the outer tube in a bayonet-style fashion, a collar shim pre-assembled and fastened into the collar with smaller chords to prevent the needle bearings from exiting the telescoping assembly.

* * * * *